US008635521B2

(12) United States Patent
Fleishman et al.

(10) Patent No.: US 8,635,521 B2
(45) Date of Patent: Jan. 21, 2014

(54) CUSTOMIZING APPLICATIONS IN A DISCOVERY INTERFACE

(75) Inventors: David Fleishman, Snoqualmie, WA (US); John Elsbree, Bellevue, WA (US); William Linzbach, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1346 days.

(21) Appl. No.: 11/657,356

(22) Filed: Jan. 24, 2007

(65) Prior Publication Data
US 2008/0077852 A1    Mar. 27, 2008

Related U.S. Application Data

(60) Provisional application No. 60/846,694, filed on Sep. 22, 2006.

(51) Int. Cl.
*G06F 17/00* (2006.01)

(52) U.S. Cl.
USPC .......................................................... 715/234

(58) Field of Classification Search
USPC ......... 715/204, 234–238, 243, 255, 764, 765; 725/37–55
See application file for complete search history.

(56) References Cited

U.S. PATENT DOCUMENTS

| | | | | |
|---|---|---|---|---|
| 5,530,754 | A * | 6/1996 | Garfinkle | 725/8 |
| 5,892,905 | A | 4/1999 | Brandt et al. | |
| 6,182,094 | B1 * | 1/2001 | Humpleman et al. | 715/234 |
| 6,249,281 | B1 * | 6/2001 | Chen et al. | 715/753 |
| 6,334,157 | B1 * | 12/2001 | Oppermann et al. | 719/310 |
| 6,405,316 | B1 | 6/2002 | Krishnan et al. | |
| 6,411,307 | B1 * | 6/2002 | Rosin et al. | 715/716 |
| 6,427,236 | B1 | 7/2002 | Chamberlain et al. | |
| 6,442,755 | B1 * | 8/2002 | Lemmons et al. | 725/47 |
| 6,469,714 | B2 * | 10/2002 | Buxton et al. | 715/762 |
| 6,675,228 | B1 * | 1/2004 | Bahrs et al. | 719/318 |
| 6,754,907 | B1 * | 6/2004 | Schumacher et al. | 725/87 |
| 6,760,902 | B1 * | 7/2004 | Ott | 717/113 |
| 6,804,825 | B1 * | 10/2004 | White et al. | 725/87 |
| 6,810,410 | B1 * | 10/2004 | Durham | 709/203 |
| 6,876,314 | B1 | 4/2005 | Lin | |
| 6,904,609 | B1 * | 6/2005 | Pietraszak et al. | 725/39 |
| 6,990,654 | B2 * | 1/2006 | Carroll, Jr. | 717/109 |

(Continued)

FOREIGN PATENT DOCUMENTS

WO      00-21002 A1    4/2000

OTHER PUBLICATIONS

Ted Husted et al, "Struts in Action: Building Web Applications with the Leading Java Framework", Oct. 22, 2002, Manning Publications Company, pp. 319-364.*

(Continued)

*Primary Examiner* — Adam M Queler

(57) ABSTRACT

A system provides customized user interface data to a media application, such as a media discovery interface, or to any application for that matter, thereby extending the original application. Via a network connection, elements of the user interface can be downloaded to the application in a package of markup data and resources, including images, text, and links. A user interface framework of the media application processes the markup from the downloaded package and utilizes packaged resources, local code components, and externally-obtained (e.g., Web resources) to render a customized application page for the media application.

16 Claims, 7 Drawing Sheets

(56) References Cited

U.S. PATENT DOCUMENTS

| | | | |
|---|---|---|---|
| 7,003,793 B2* | 2/2006 | Hwang et al. | 725/91 |
| 7,111,243 B1* | 9/2006 | Ballard et al. | 715/744 |
| 7,343,550 B2* | 3/2008 | Saidenberg et al. | 715/205 |
| 7,509,374 B2* | 3/2009 | Trinh et al. | 709/203 |
| 7,631,328 B2* | 12/2009 | Clancy et al. | 725/39 |
| 7,890,853 B2* | 2/2011 | Neil et al. | 715/234 |
| 2002/0120940 A1* | 8/2002 | Willard | 725/91 |
| 2002/0129064 A1 | 9/2002 | Guthrie | |
| 2003/0001880 A1* | 1/2003 | Holtz et al. | 345/716 |
| 2003/0090506 A1* | 5/2003 | Moore et al. | 345/730 |
| 2003/0204833 A1 | 10/2003 | Pokhariyal | |
| 2004/0045028 A1* | 3/2004 | Harris | 725/86 |
| 2004/0049536 A1 | 3/2004 | Wand et al. | |
| 2004/0205484 A1 | 10/2004 | Pennington, Jr. et al. | |
| 2004/0243971 A1 | 12/2004 | Leung | |
| 2005/0160414 A1 | 7/2005 | Parnanen et al. | |
| 2005/0160458 A1* | 7/2005 | Baumgartner | 725/46 |
| 2005/0257208 A1 | 11/2005 | Blumfield et al. | |
| 2006/0136872 A1* | 6/2006 | Barr et al. | 717/114 |
| 2006/0174314 A1* | 8/2006 | Jacobs et al. | 725/135 |
| 2006/0253871 A1* | 11/2006 | Berti | 725/61 |
| 2006/0259925 A1* | 11/2006 | Lemmons et al. | 725/39 |
| 2008/0250465 A1* | 10/2008 | Kim et al. | 725/87 |
| 2010/0131996 A1* | 5/2010 | Gauld | 725/100 |

OTHER PUBLICATIONS

Andersson, et al., "Dynamic Code Update in JD", http://scholar.google.com/scholar? hl=en&lr=&q=cache:PXie5eQuWblJ:www-lincks.ida.liu.se/~tobri/papers/dyncodeupd.pdf+feature+update+without+download+.

Vandewoude, et al., "An Overview and Assessment of Dynamic Update Methods for Component-oriented Embedded Systems", http://www.cs.kuleuven.ac.be/~yvesv/Publications/OverviewDUComponentsSERP2002.pdf.

International Preliminary Report on Patentability and Written Opinion for application PCT/US2007/076314 mailed on Mar. 24, 2009, 5 pages.

* cited by examiner

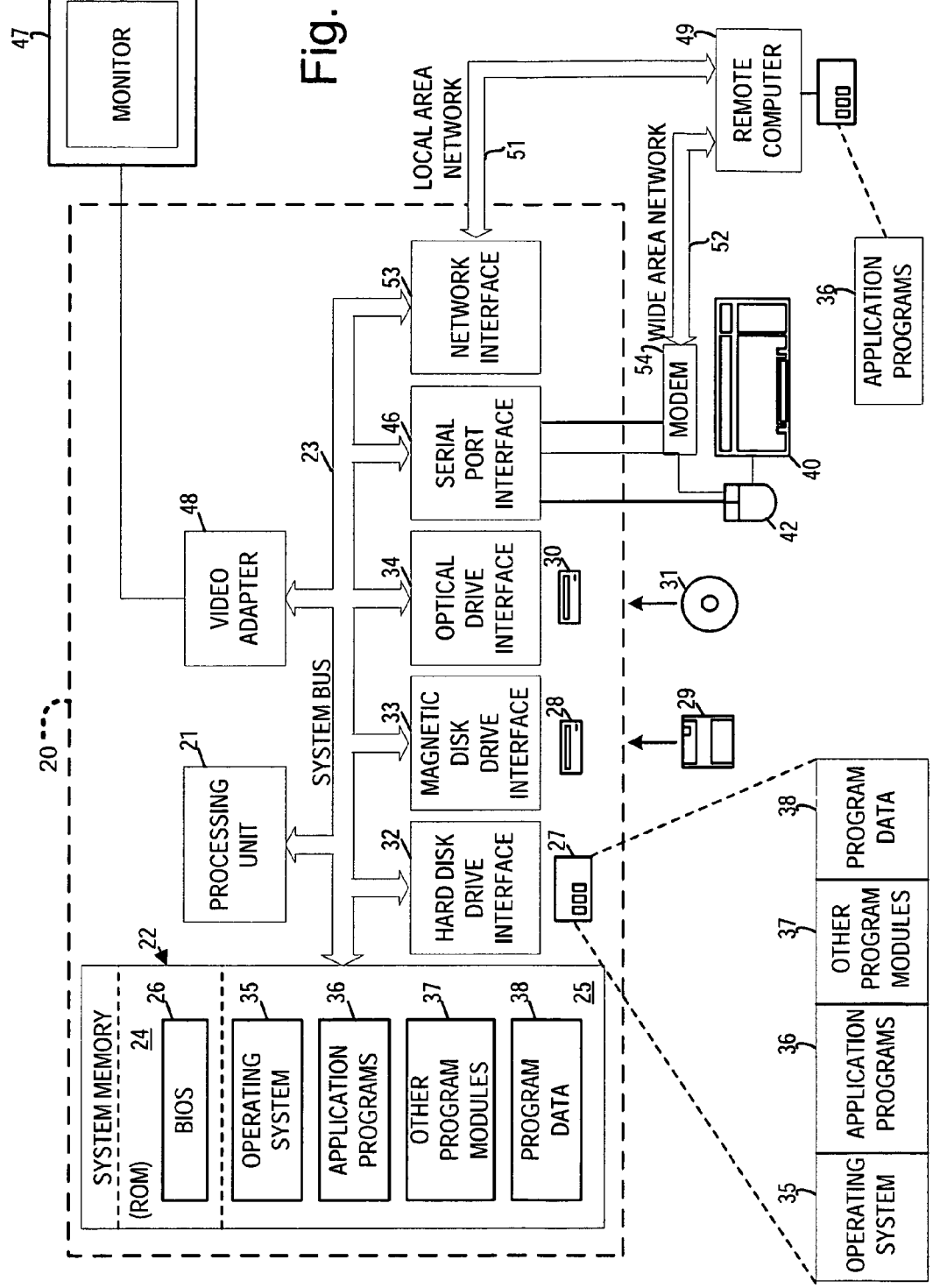

CUSTOMIZING APPLICATIONS IN A DISCOVERY INTERFACE

CROSS-REFERENCE TO RELATED APPLICATIONS

The present application claims benefit of U.S. Provisional Patent Application No. 60/846,694, entitled "Customizing Applications in a Discovery Interface" and filed on Sep. 22, 2006, which is specifically incorporated by reference for all that it discloses and teaches.

The present application is related to U.S. patent application Ser. No. 11/657,244, entitled "Customizing a Menu in a Discovery Interface" and filed on Jan. 24, 2007, and to U.S. patent application Ser. No. 11/657,439, entitled "Customizing Application Page Loading in a Discovery Interface" and filed on Jan. 24, 2007, which are specifically incorporated by reference for all that they disclose and teach.

BACKGROUND

The convergence of computing and entertainment continues to provide new content and options for consumers. For example, cable subscribers can now access cable television programs and video-on-demand content (VOD) through their set-top boxes. In one offering, a video-on-demand service allows a user to select a program for viewing from a library of programs, wherein all of the programs are available at any time and can be paused, saved, reviewed, etc. (as opposed to a cable television program that is only available at a scheduled time and duration). Other sources of content may also exist, including content from a media library, an Internet Protocol (IP) stream, a Web site, etc.

Consumers and content providers can find great benefit in the availability of content from so many different types of sources. For example, a consumer can view a rerun episode of a cable television program and then search for and view a subsequent episode of the same program over VOD or some other content providing channel. For their part, content providers can keep people "tuned in" with a wider assortment of content and content types.

In providing a user interface to access such a wide variety of content, certain media applications provide a discovery interface. In one existing example, a discovery interface takes the form of an Electronic Programming Guide (EPG). However, the available content, and more importantly the ways in which to access such content, may need to change dramatically overtime. Existing EPGs fail to adequately accommodate changes to the user interface and functionality of application pages used to access the ever-changing content.

SUMMARY

Implementations described and claimed herein address the foregoing problems by providing customized user interface data for a media application, such as a media discovery interface, or to any application for that matter, thereby extending the original application. Via a network connection, elements of the user interface can be downloaded to the application in a package of markup data and resources, including images, text, and links. A user interface framework of the application processes the markup data from the downloaded package and utilizes packaged resources, local code components, and externally-obtained (e.g., Web resources) to render a customized application page for the media application.

In some implementations, articles of manufacture are provided as computer program products. One implementation of a computer program product provides a computer program storage medium readable by a computer system and encoding a computer program. Another implementation of a computer program product may be provided in a computer data signal embodied in a carrier wave by a computing system and encoding the computer program. Other implementations are also described and recited herein.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTIONS OF THE DRAWINGS

FIG. 7 illustrates an example system that may be useful in implementing the described technology.

DETAILED DESCRIPTIONS

Figure 1:
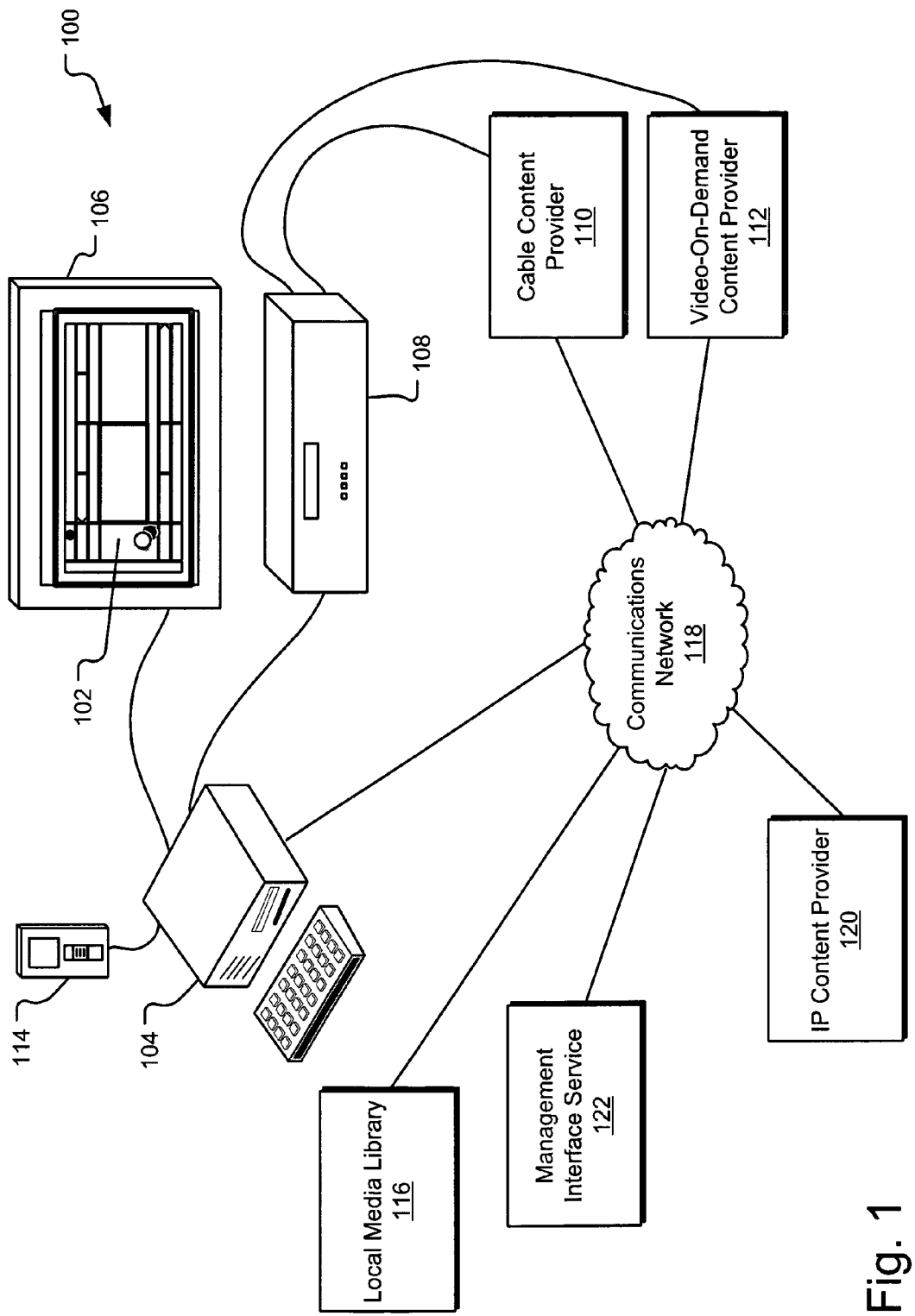
FIG. 1 illustrates an example system for presenting discovery data and applications in a customizable discovery interface.

FIG. 1 illustrates an example system 100 for presenting discovery data and applications in a customizable discovery interface 102. A user's computing system 104 is coupled to a display device 106, which is capable of presenting the customizable discovery interface 102. The computing system 104 is also coupled to a tuner device 108 (e.g., a set-top box or a tuner card internal to the computing device), which communicates with a cable content provider 110 and a video-on-demand content provider 112. It should be understood that the cable content provider 110 and the video-on-demand content provider 112 may be represented by the same entity. Furthermore, content providers that compete with the cable providers, such as satellite services and airwave-based broadcast television stations, may also be supported in a similar manner. Content providers for other media, such as satellite radio, broadcast radio, etc., may also be supported through computing system 104.

In one implementation, the computing system 104 executes a media application that manages the user's access to media content, whether available locally or remotely. For example, the user can use his or her computing system 104 to control a portable media player 114, the tuner device 108, a local media library 116, and other content available from discrete devices or over a communications network 118. Examples of the control a user may apply can include without limitations transferring content between a portable media player 114 and a local media library 116, scheduling the recording of a cable television program by a digital video recorder (not shown) coupled to the computing system 104, downloading IP content (such as a video or song) from an IP content provider 120, etc.

In one implementation, the media application also provides the discovery interface 102 on a display device 106 (e.g., a monitor or television) coupled to the computing device 104.

Discovery data is obtained through a media information service 122, which collects program information about content from a variety of sources. The media information service 122 maps data from a variety of sources to one or more consistent schema, enabling a consistent discovery experience, and associates the content from different sources to provide interrelationships among the content elements. The discovery interface 102 can be represented by an on-screen guide, such as an electronic program guide (EPG), although various monikers may be used in other implementations, including without limitation interactive program guide (IPG) and electronic service guide (ESG). The discovery interface 102 presents an on-screen guide to the available content (e.g., broadcast content, such as scheduled cable television programs, and non-broadcast content, such as available IP content, locally stored media, etc.) in which broadcast content and non-broadcast content are shown together via virtual channels of the unified discovery interface.

In one implementation, the discovery interface 102 provides a graphical user interface that can display program titles and other descriptive information (collectively "discovery data"), such as a summary, actors' names and bios, directors' names and bios, year of production, etc. In one implementation, the information is displayed on a grid with the option to select more information on each program, although other formats are also contemplated. Channel identifiers pertaining to the scheduled cable programs, the program start and end times, genres, thumbnail images, and other descriptive metadata can also be presented within the discovery interface 102. Radio and song information may offer other information, such as artist, album, album cover graphics, and track title information. The discovery interface 102 allows the user to browse program summaries; search by genre, channel, etc.; and obtain immediate access to the selected content, reminders, and parental control functions. If the computing device 104 is so configured or so connected, a discovery interface 102 can also provide control for scheduled recording of programs.

A user can use the discovery interface 102 to navigate, select, and discover content by a variety of parameters, including time, title, channel, genre, cost, actors, directors, sources, relationships to other content, etc. Navigation can be accomplished through the media application by a variety of input devices, such as a remote control, a keyboard, and a mouse. In one implementation, for example, the user can navigate through the discovery interface 102 and display information about scheduled cable programs, video-on-demand programs, and associated IP content within a single presentation frame. By navigating through the discovery interface 102, the user can manipulate and obtain more information about a current program or about other programs available through the discovery interface 102. For example, when the computing device 104 is connected to a cable content provider 110, the user can plan his or her viewing schedule, learn about the actors of available programs, and record cable programs to a hard disk in the computer device 104 for later viewing.

In one implementation, a customized application package can be downloaded to the computing system 104 in order to customize the data and applications available to the user through the discovery interface 102. The customized application package is typically downloaded from the management interface service 122, but customized application packages may be available from the local (or remote) media library 116 or from various content providers, such as content providers 110, 112, and 120. A customized application package may include without limitation images, listings of available content, text, markup language files, internal and external links used to present a customizable discovery interface to a user, etc. In one implementation, one or more menus of the discovery interface 102 may be customized with new images, text, functionality, selections, endpoints, etc. In another implementation, individual application pages that are referenced from a menu or other selection may be customized.

Figure 2:
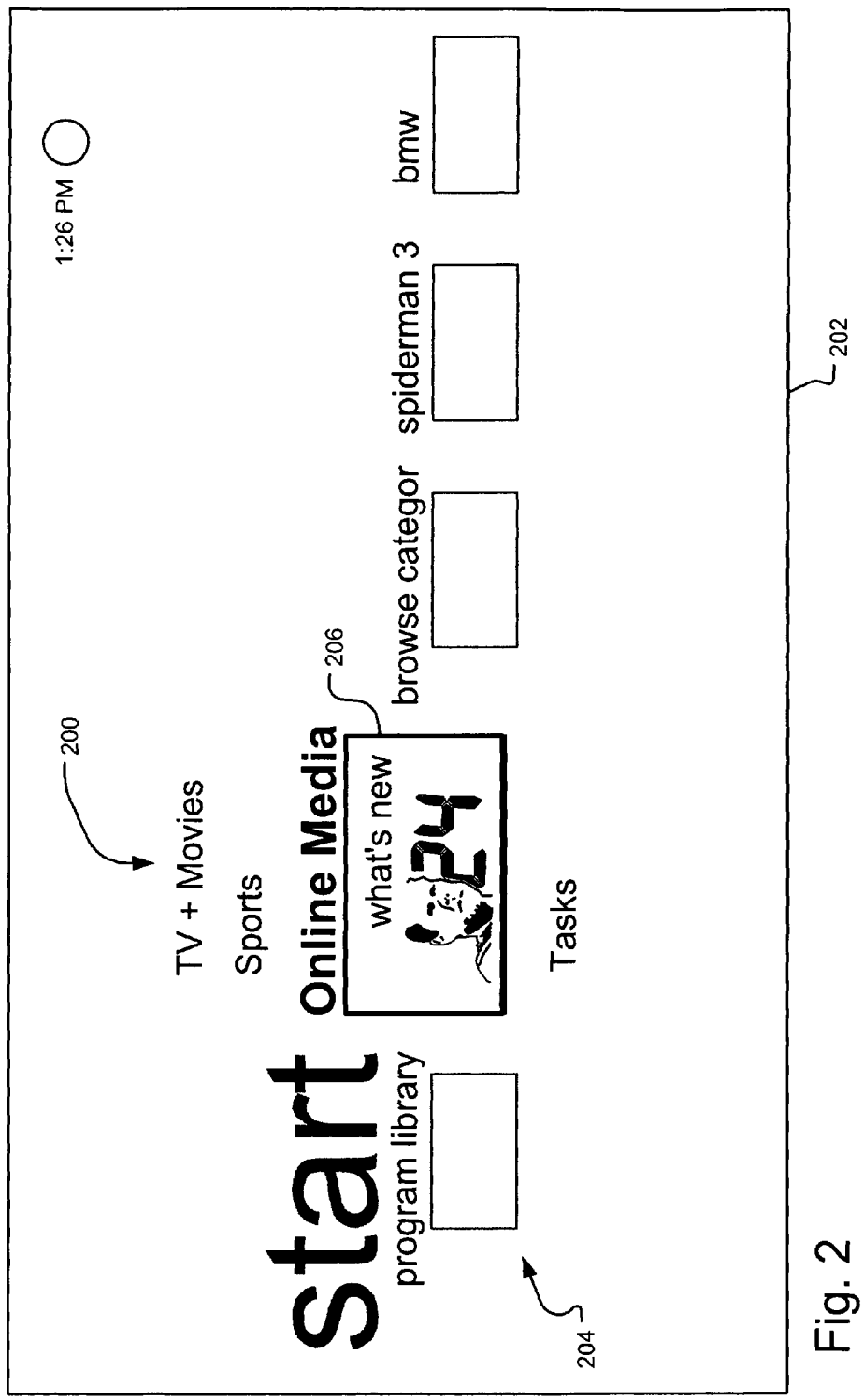
FIG. 2 illustrates an example menu within a customizable discovery interface.

FIG. 2 illustrates an example menu 200 within a customizable discovery interface 202. The menu 200 may include without limitation menu items for built-in application pages, customized application pages, and Web pages. Vertical menu items provide access to categories of offerings (e.g., "TV+ Movies", "Sports", "Online Media", etc.). Within the current menu item (i.e., "Online Media"), several offering tiles are provided in an offering strip 204. By selecting one of the offering tiles (such as tile 206), a user can launch an application page or user interface page that provides functionality for the offering. For example, a user may select tile 206 to launch an application page that allows the user to browse and select various categories of new online media content, including content from sources such as ABC Online, FOXsports.com, FOX.com, Showtime Online, etc. The offering tiles themselves may be static (e.g., built-in and statically linked), have customizable faces (e.g., the linked application page is static, but the tile graphic displayed to the user may be updated using downloaded resources), fully customizable (e.g., the tile graphic, the linked application page may be updated using a downloaded package, etc.), or something in between.

In one implementation, the start menu is represented internally by a markup data file that specifies a user interface having a set of menu items and offering tiles. A user interface (UI) framework processes the start menu markup data and renders the start menu on the display accordingly. One or more of the menu items and/or offering tiles may be built into the media application executing on the computing system. For such built-in menu items or offering tiles, the start menu markup data has statically defined links to built-in application pages, which were installed with the media application or added to the media application in an update.

One or more of the menu items and/or offering tiles may also be customizable. For these menu items or offering tiles, a placeholder exists in the start menu markup data, such that if resources have been downloaded for a specific placeholder (e.g., they share the same name, etc.), the menu item or offering tile is rendered for that placeholder. Alternatively, if no resources have been downloaded for a specific placeholder, the menu item or offering tile is "hidden" (i.e., not displayed). If the rendered menu item or tile for a customized offering is selected, the user interface framework opens the package referenced by the placeholder and renders the customized application page using the packaged markup data and resources. Furthermore, one or more of the menu items or offering tiles may reference Web pages available over a network (or even HTML pages stored within or otherwise accessible by the media application).

In an alternative implementation, the start menu may be implemented using a package or a Web page, rather than a static markup data file. In such an implementation, the media application could access a downloaded package or Web page to render and provide functionality for the start up menu.

Figure 3:
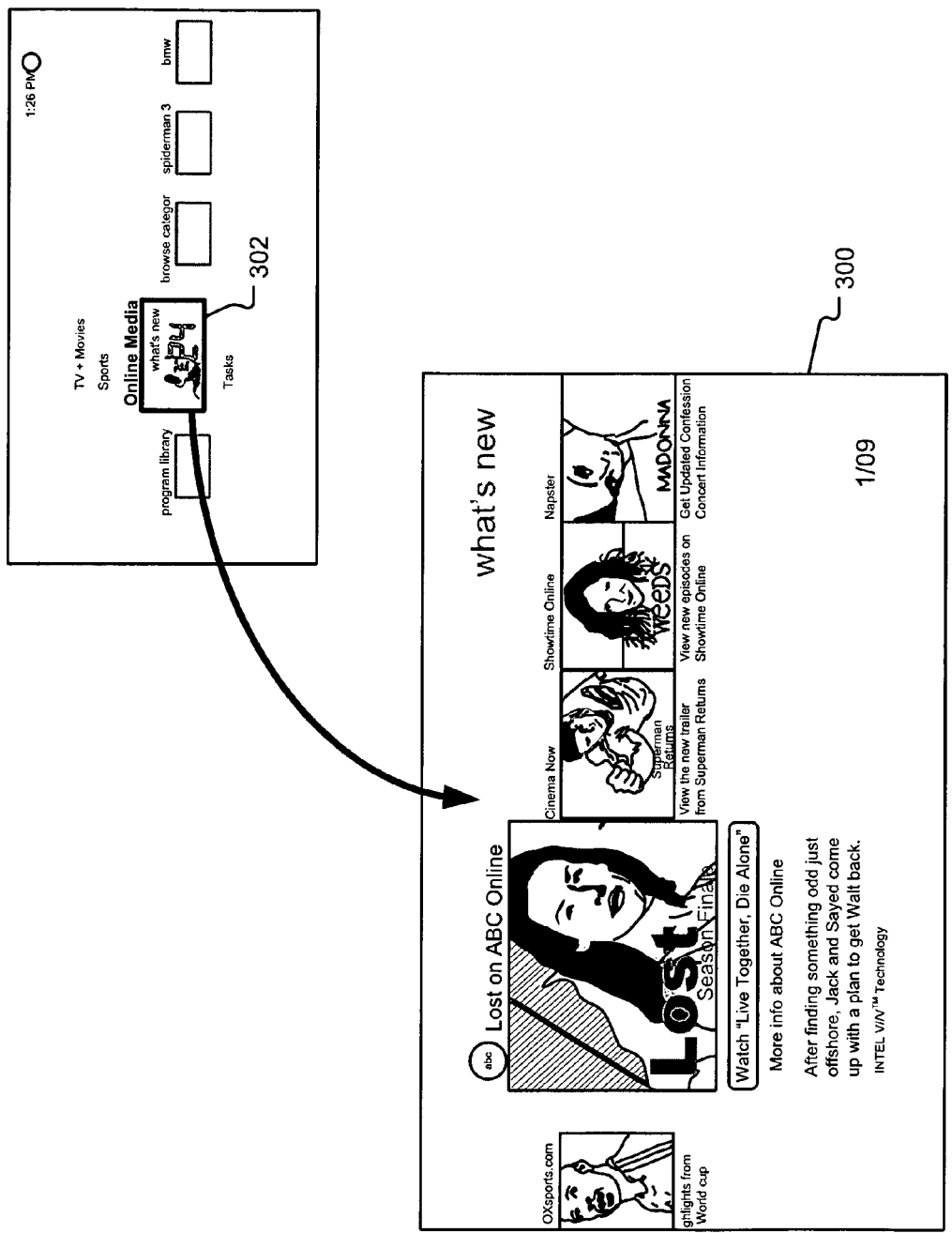
FIG. 3 illustrates an example application page that can be triggered by a selection of an offering tile.

FIG. 3 illustrates an example application page 300 that can be triggered by a selection of an offering tile 302 from a start menu. The application page 300 may be (a) a built-in application page, which uses markup data that is built-in into the media application on the computing system; (b) a customized application page, which uses markup data downloaded in a package from a remote source; or (c) a Web application page, which is retrieved upon selection from a Web source. Other types of application pages may also be employed. Each menu item and/or offering tile in the application page can further invoke other built-in, customized, Web, or other application pages.

Figure 4:
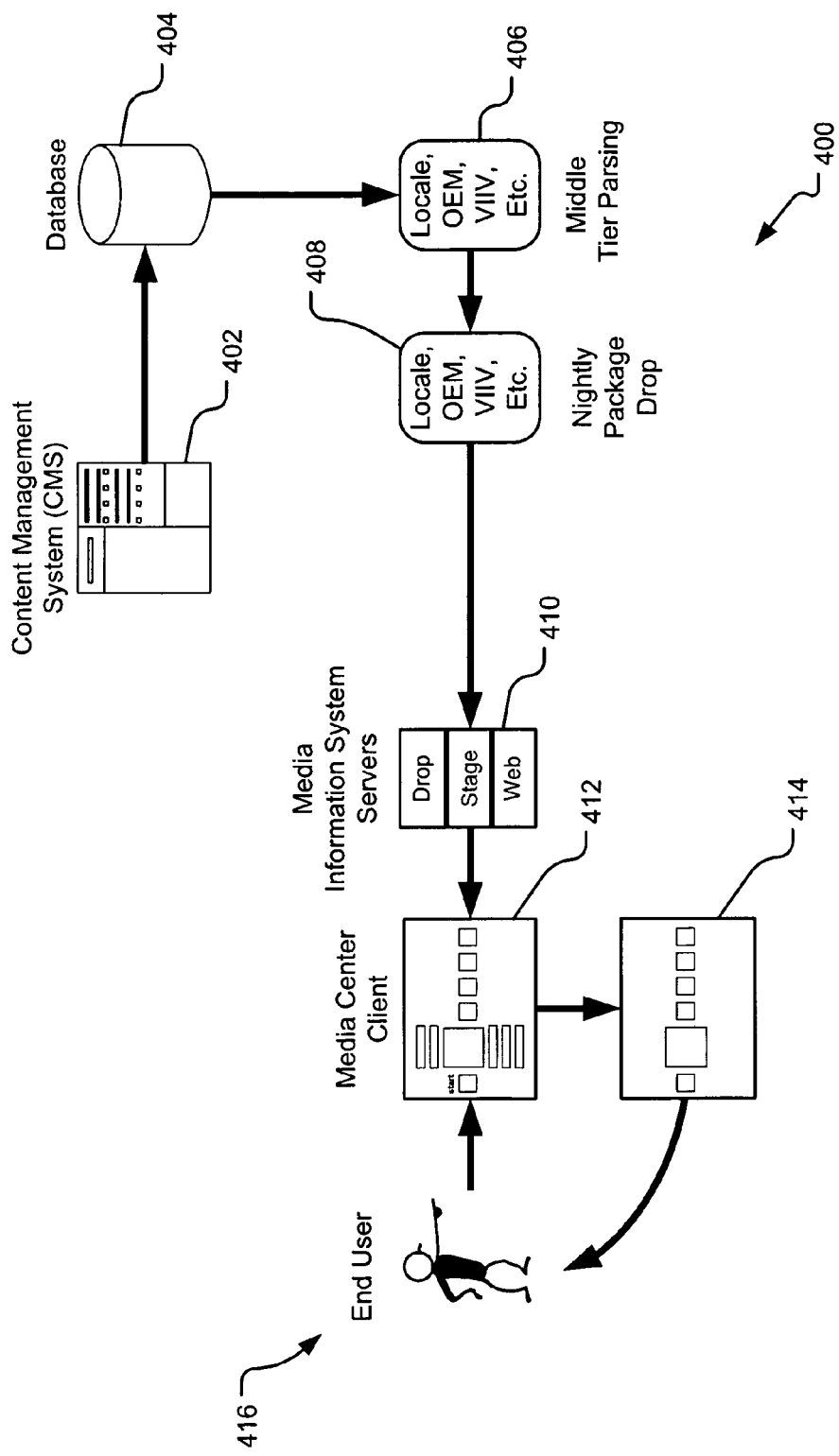
FIG. 4 illustrates an example content management and delivery system.

FIG. 4 illustrates an example content management and delivery system 400. A content management system 402 collects and stores media data, including without limitation one or more of program listings, content, customizing packages, parental ratings, preferences, and other parameters, into a database 404. A middle tier parsing module 406 extracts an application package (e.g., for a customized application page) based on predefined filtering parameters, including without limitation one or more of geographical locale, OEM relationship of the equipment, system capabilities, user preferences and characteristics, etc. A package drop module 408 periodically uploads selected packages to a media information system server 410, which has information specifying "drop", "stage", and "Web" parameters. "Drop" refers to the internal location where a package is stored for the delivery service to pickup. "Stage" refers to a testing location where a package can be downloaded and verified. "Web" refers to the final network location (e.g., an IP address or URI) where customers will have the package delivered to them. The media information system server 410 downloads the packages to a media application on a client computing system (e.g., screenshot icon 412 represents a start menu and screenshot icon 414 represents an application page).

An end user 416 can then interact with the media application executing on the client computing system to select offerings. For example, the end user 416 can select an offering tile from the start menu to access a built-in application page, a customized application page, or a Web application page. In some implementations, the end user 416 may employ a remote control, a keyboard, a mouse, a touch screen, etc. to interact with the media application.

Figure 5:
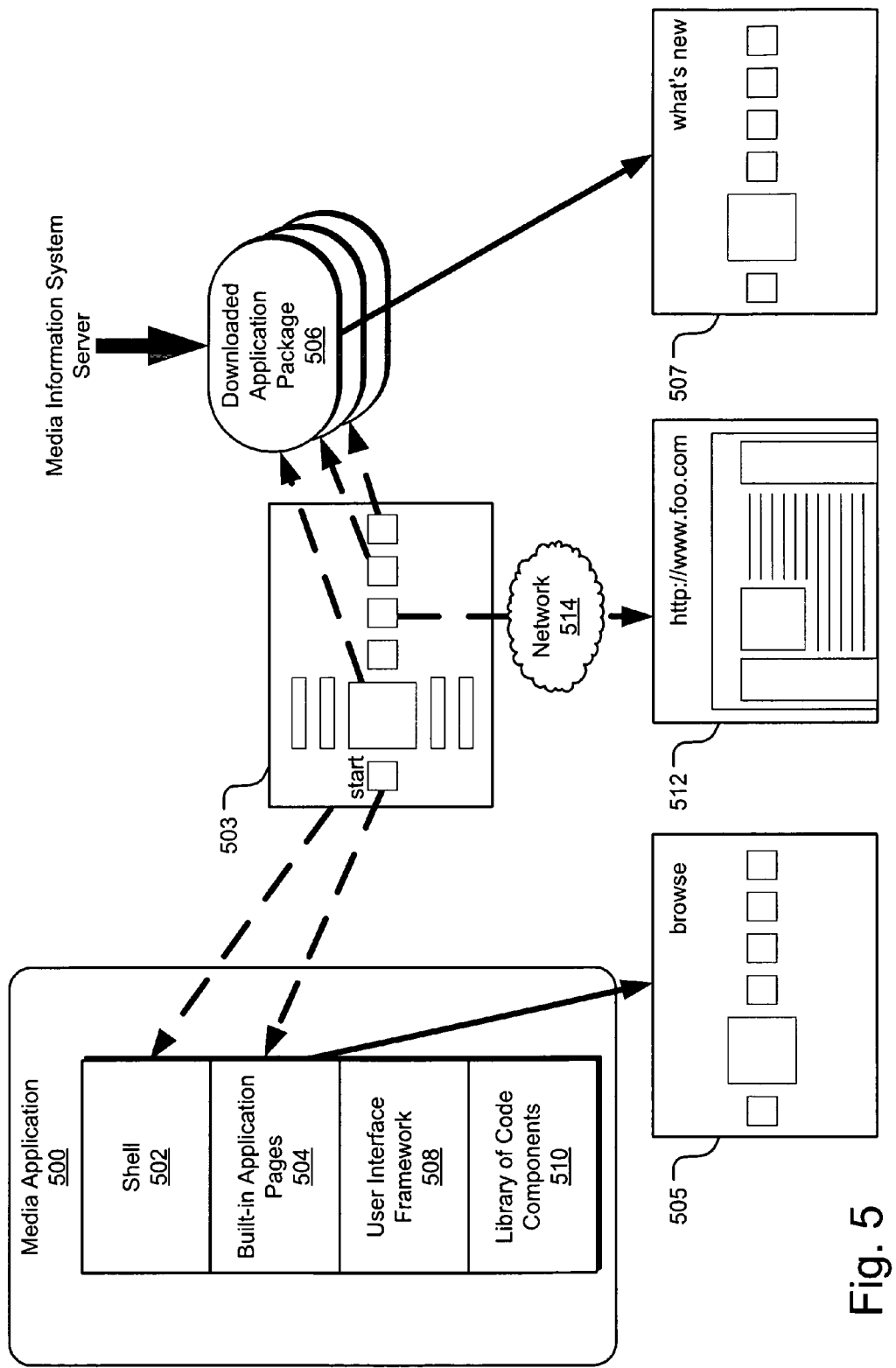
FIG. 5 illustrates an architecture for an example media application.

FIG. 5 illustrates an architecture for an example media application 500, although it should be understood that a similar architecture may be employed in non-media applications. A shell 502 represents a core user interface module of the media application, including the start menu markup data, resources, and other structural aspects of the media application. The shell 502 also handles navigation events for navigating among application pages and the detection/loading of the downloaded application packages 506. A start menu page 503 and all other user interface pages are rendered based on markup data, resources, local libraries of code components 510, and other data and program code by the user interface framework 508.

Built-in application pages 504 represent application pages (such as a built-in application page 505) that are incorporated into the distribution of the media application, including markup data and resources for individual application pages accessible through the start menu and other offering tiles of the media application. Application packages 506 represent customized application pages (such as a customized application page 507) that have been downloaded in package form, such as from a media information system server, including markup data and resources of customized applications within the media application. Such packages are typically downloaded to the client computer system on which the media application executes during expected idle periods (e.g., overnight). Web application pages (such as Web page 512) may be linked to Web resources and downloaded via a network 514.

Portions of an example markup data listing included within an application package 506 for a customized application page ("Browse Categories") are listed below (although similar markup data could be used for a built-in application page).

```
<!-- Browse Categories page -->
<UI Name="BrowseCategories"
   BaseUI="bpage:SpotlightBrowseBasePage">
```

The <UI Name="BrowseCategories"...> element defines the user interface for the customized "Browse categories" application page, which can be launched from the "browse categories" tile in the Online Media section of the Start menu. The user interface elements of this page are based on SpotlightBrowseBasePage, which defines common behavior shared by multiple browse pages in the package, thereby allowing for a consistent user interface style.

Another portion of the markup data listing (see immediately below) may define local variables that override selected inherited variables of the same name, which are defined in the base user interface class. In this case, the Choice object defines each of the pivots (e.g., menu items) on the application page: "tv+movies", "music+radio", etc. The "Choice" object provides the data for each of the pivots on the page, and the items to display in the gallery for each pivot. The names Choice, BrowsePivot, String, Image, MarkupBrowseDataSet, and MarkupBrowseItem all refer to various managed-code classes.

```
<Locals>
   <Choice Name="Pivots">
      <Options>
         <shl:BrowsePivot Description="tv + movies"
            ContentLabel="explore"
            EmptyContentText="No content available."
            ContentTemplate="@res://Microsoft.MediaCenter.Shell!
                                    BrowseGallery.mcml#Gallery"
            ContentItemTemplate="data://Spotlight!GalleryItem.mcml"
DetailTemplate="data://Spotlight!BrowseDetails.mcml">
   <Content>
      <util:MarkupBrowseDataSet SortOrder="Rotating">
         <Source>
```

This BrowsePivot object for "tv+movies" references two other user interface elements, the ContentItemTemplate and DetailTemplate, which are to be found in files entitled GalleryItem.mcml and BrowseDetails.mcml, respectively. The ContentItemTemplate specifies the user interface behavior for each individual user interface element to be displayed in the gallery. The DetailTemplate specifies the user interface behavior for some additional details that are displayed at the bottom of the customized application page.

Each of the next two sections defines an offering tile in the customized application page. One is labeled "TVTonic" with a tile graphic is defined by a bitmap image at "data://Spotlight!1112.gif". The TVTonic offering tile is set to a URL that references a target Web application page at "http://www.tvtonic.com/activation/MCE/?link=games" and includes a tracking identifier. It should be understood that the TVTonic offering tile could alternatively have referenced another customized application page or a built-in application page, in which case the NonMcmlUrl variable would be set to a URL for such a page.

```
<util:MarkupBrowseItem Description="TVTonic"
    ImageSource="data://Spotlight!1112.gif"
    NonMcmlUrl="http://www.tvtonic.com/
                activation/MCE/?link=games"
    TrackingId="1117">
    <Properties>
        <cor:String Name="Slogan" String="Subscribe to game
                    trailers,videoblogs & more. Free!"/>
        <Image Name="OfferImage" Source="data:
                    //Spotlight!1117.gif"/>
    </Properties>
</util:MarkupBrowseItem>
```

The TVTonic offering tile also has defined slogan text associated with the tile "Subscribe to game trailers, videoblogs & more. Free!" with an associated graphic image, which can appear when the TVTonic offering tile has the focus.

Another offering tile, for American Chopper", is defined below, with a reference to a Web application page.

```
<util:MarkupBrowseItem Description="American Chopper"
    ImageSource="data://Spotlight!50.jpg"
    NonMcmlUrl="http://highspeed.discovery.com/wmc/epg/"
    TrackingId="142">
    <Properties>
        <cor:String Name="Slogan" String="See sparks fly
                    Mondays at 10 p.m. ET/PT."/>
        <Image Name="OfferImage" Source="data:
                    //Spotlight!142.jpg"/>
    </Properties>
</util:MarkupBrowseItem>
```

Another user interface behavior, called "MoreTV" and defined in the same package, is based on the "BrowseCategories" user interface element defined above. The "MoreTV" user interface element initializes the pivots such that the pivot with index 0 (e.g., the "tv+movies" pivot) will be selected when the page is first loaded.

```
<UI Name="MoreTV" BaseUI="me:BrowseCategories">
    <Rules>
        <!-- "tv + movies" is pivot 0 -->
        <Default Target="[Pivots.ChosenIndex]" Value="0"/>
    </Rules>
</UI>
```

In the application package 506 or in the native media application, example markup data defines the Base user interface element for browse application pages ("Browse Page"). The SpotlightBrowseBasePage user interface element above defines the base user interface element for the browse pages in the Spotlight package. This user interface element is itself based on a user interface element named "Browse", which defines the common behavior for all browse pages throughout a media application and is an example of a built-in application page. The browse page uses a "model" object that provides the content for the page. Initially, the model is an empty placeholder that will be replaced with the actual data at runtime.

```
<UI Name="SpotlightBrowseBasePage" BaseUI="browse:Browse">
    <Properties>
        <!-- Model is empty initially. A rule will replace -->
        <!-- the Pivots of the model with the actual data. -->
```

```
        <shl:BrowseModel Name="Model">
            <Commands>
                <ArrayListDataSet/>
            </Commands>
            <Pivots>
                <Choice>
                    <Options>
                        <shl:BrowsePivot>
                            <Content>
                                <ArrayListDataSet/>
                            </Content>
                        </shl:BrowsePivot>
                    </Options>
                </Choice>
            </Pivots>
        </shl:BrowseModel>
        <util:MarkupPage Name="PageModel" MarkupPage="$Required"/>
    </Properties>
        A local variable named "Pivots" is defined. This variable's
value is intended to be overridden by any user interface element that is
based on this user interface element.
    <Locals>
        <!-- Derived UI should redefine this Local to contain the actual
             pivot data -->
        <Choice Name="Pivots">
            <Options>
                <shl:BrowsePivot>
                    <Content>
                        <ArrayListDataSet/>
                    </Content>
                </shl:BrowsePivot>
            </Options>
        </Choice>
    </Locals>
```

The customized application package 506 can also define user interface rules for customized application page. A <!-- Replace Model.Pivots with the actual data --> rule copies the local Pivots variable to the Pivots property of the Model, making the content available to the page. A <!-- Set the app GUID for the benefit of the Start Menu --> rule initializes the SMAppGuid property of the PageModel. (Note: "GUID" refers to a Globally Unique IDentifier.) The value identifies the Start menu section with which this page is associated, providing the customized application page with a reference back parameter to the calling application page (e.g., the start menu), and further to a specific user interface element of the calling application page that was selected to invoke the customized application page. In this manner, the customized application page is integrated with other application pages of the media application to allow navigation to and from the page. This particular value corresponds to the "Online Media" section. If the user invokes a "back" navigation action while on this page, the Start menu will be displayed, with the "Online Media" section in focus.

```
    <Rules>
        <!-- Replace Model.Pivots with the actual data -->
        <Default Target="[Model.Pivots]" Value="[Pivots]"/>
        <!-- Set the app guid for the benefit of the Start Menu -->
        <Default Target="[PageModel.SMAppGuid]" Value=
                "{A8ADD452-1D1A-4775-ACF2-565796306789}"/>
    </Rules>
```

Portions of another example markup language listing below define the user interface element for individual items in the gallery, based on a shared Base UI GalleryItem. The ThumbSize and NumberOfRows properties of the base user interface element are overridden to customize the appearance of the gallery items. As the user navigates around the gallery, various items gain and lose the focus. Each time an item gains or loses focus, a corresponding property on the underlying model item is set using a Binding (e.g., <Binding Source=" [Input.DeepKeyFocus]" Target="[Model!util:Markup-BrowseItem.HasFocus]"/>).

```
<UI Name="SpotlightGalleryItem" BaseUI="browse:GalleryItem">
    <Properties>
        <Size Name="ThumbSize" Size="240, 180"/>
        <cor:Int32 Name="NumberOfRows" Int32="2"/>
    </Properties>
    <Rules>
        <Binding Source="[Input.DeepKeyFocus]" Target="[Model!util:
                MarkupBrowseItem.HasFocus]"/>
    </Rules>
</UI>
```

A user interface framework 508 processes the markup data of the shell 502, the built-in application pages 504, and the downloaded application pages 506. As for the shell 502, the user interface framework 508 parses the start menu markup data, for example, and renders the start menu defined by the markup data. In the cases of both built-in application pages 504 and downloaded application pages 506, when the appropriate application is triggered (e.g., by activation of an offering tile by the user), the user interface framework 508 ingests the markup language of the application pages referenced by the trigger and renders the application page defined by the markup data.

The markup data for application pages 504 and 506 and the shell 502 can reference code in a library 510 of code components. These code components provide functionality, such as manipulating and filtering tables of content metadata, initiating and controlling playback of media content, and interacting with the operating system, etc. The markup data references a specific code component and the user interface framework 508 includes the functionality to execute the code in the context of the current user interface.

Figure 6:
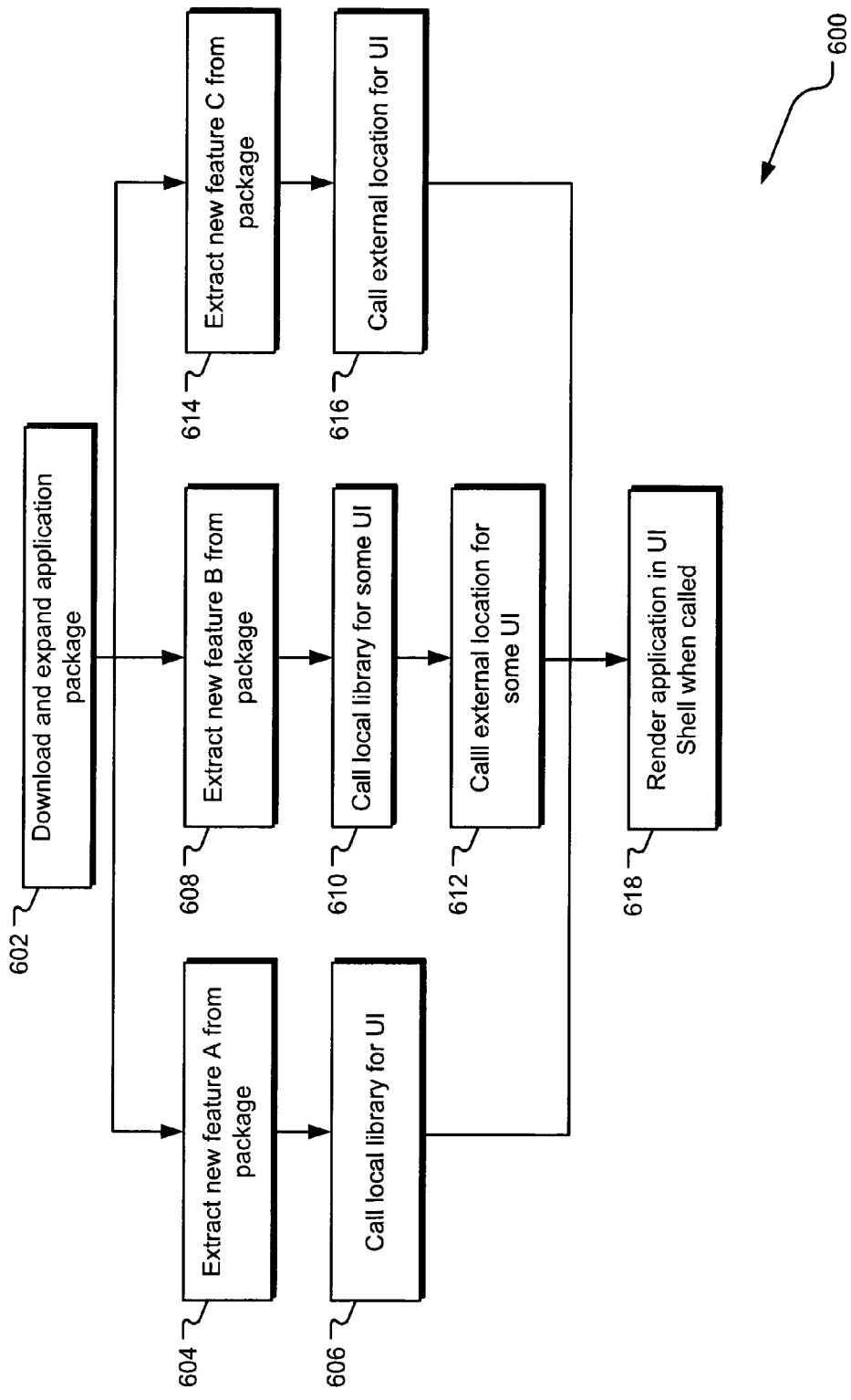
FIG. 6 illustrates example operations for customizing applications in a discovery interface.

FIG. 6 illustrates example operations 600 for customizing applications in a discovery interface. A downloading operation 602 downloads an application package, which may include markup data, images, text, and other resources, received via a communications network (e.g., via a Web service). When a user makes a selection of an offering tile through the user interface of the media application, an application identifier (or AppId) in the markup data for each menu item referencing a customized application page identifies the application code module that manages interactions with that particular menu item. Typically, all items in a particular section of the menu reference the same AppID (although this is not required). The referenced application code module (e.g., [Spotlight]) uses another property of the State Menu item—the TargetPageID—to look up the URL of the markup data in downloaded application packages.

In the example described below, markup data for menu items pertaining to third-party application pages, built-in application pages, and customized application pages is provided. In addition, a menu item may reference link to a Web page. A PartnerQuickLink element represents a start menu item for activating an external, third-party application that is resident on the user's computer system, such as Napster.

```
<home:PartnerQuickLink
    Icon="SM.Spotlight.Promo"
    Title="#SM.Spotlight.Promo1"
    ViewTemplate="QuickLinkView"
    AppId="[Spotlight]"
    EntryPointId="[SpotlightPromo1EP]"
    Priority="11"/>
```

A QuickLink element represents a start menu item for activating a built-in application page.

```
<home:QuickLink
    Icon="SM.Spotlight.Favorites"
    Title="#SM.Spotlight.Favorites"
    ViewTemplate="QuickLinkView"
    AppId="[Spotlight]"
    EntryPointId="[SpotlightFavoritesEP]"
    Priority="10"/>
```

A PackageMarkupQuickLink element represents the menu items capable of being activated via a downloaded application package (i.e., a customized menu item) and of activating a customized application page.

```
<home:PackageMarkupQuickLink
    ResourceProviderId="Spotlight"
    TitleId="1011"
    ImageBaseName="StartMenu.QuickLink.Spotlight.1"
    TargetPageId="1012"
    ViewTemplate="QuickLinkView"
    AppId="[Spotlight]"
    Priority="0"/>
```

The PackageMarkupQuickLink menu items activate themselves by looking for the corresponding resources in an application package identified by the ResourceProviderId, if found on the client. For example, the first PackageMarkupQuickLink above will be activated if the "Spotlight" package contains a string resource with ID 1011 (the value of the TitleId property) as well as the image resources having IDs "StartMenu.QuickLink.Spotlight.1.Focus.png" and "StartMenu.QuickLink.Spotlight.1.NoFocus.png" (each of these names being formed by appending strings (e.g., Focus or NoFocus) to the value of the ImageBaseName property). TargetPageID references a string resource in the package. That string resource, in turn, contains the name of the target application page that results in activation of the Start menu item. The Priority specifies which item in the menu should be the default item (the item that is given focus when the menu is first displayed). In one implementation, for example, a lower numeric value corresponds to a higher priority. The highest-priority item—among those items that are marked "visible"—will be the default item when the menu is displayed.

Alternatively, if no resources have been downloaded for a specific placeholder, the menu item or offering tile is "hidden" (i.e., not displayed). If the rendered menu item or tile for a customized offering is selected, the user interface framework opens the package referenced by the placeholder and renders the customized application page using the packaged markup data and resources contained in the package. Furthermore, one or more of the menu items or offering tiles may reference Web pages available over a network (or even HTML pages stored within or otherwise accessible by the media application).

Portions of an example application package are described below, which describe labels and links that correspond to various user interface elements on the Start menu. A string definition section, immediately below, defines references used to construct the customized offering tiles of the Start Menu. A first string in each pair defines the label to display on-screen in association with an offering tile. A second string in each pair defines either the name of a markup resource contained in this application package or the URL of a built-in application page or a Web application page to be retrieved from the Internet.

```
// Online Media section, slot 1
1011   "what's new"
1012   "WhatsNew.mcml"
// Online Media section, slot 2
1021   "explore"
1022   "BrowseCategories.mcml"
```

A portion of a markup resource definition section, immediately below, defines pathnames to markup data files (e.g., "RCDATA "Mcml\\WhatsNew.mcml") referenced within the application package. Each application may describe, without limitation, a page of user interface or a component of another page.

```
WhatsNew.mcml          RCDATA "Mcml\\WhatsNew.mcml"
BrowseCategories.mcml  RCDATA "Mcml\\BrowseCategories.mcml"
MoreLinks.mcml         RCDATA "Mcml\\MoreLinks.mcml"
BrowsePage.mcml        RCDATA "Mcml\\BrowsePage.mcml"
BrowseDetails.mcml     RCDATA "Mcml\\BrowseDetails.mcml"
GalleryItem.mcml       RCDATA "Mcml\\GalleryItem.mcml"
```

Portion of an example image resource section of an application package, listed immediately below, defines bitmap images for the items on the Start menu. Each item in the example elements has two images to represent the item in its non-focused and focused states.

```
// Online Spotlight, slot 1
StartMenu.QuickLink.Spotlight.1.NoFocus.png RCDATA
"Png\\StartMenu.QuickLink.WhatsNew.NoFocus.png"
StartMenu.QuickLink.Spotlight.1.Focus.png RCDATA
"Png\\StartMenu.QuickLink.WhatsNew.Focus.png"
// Online Spotlight, slot 2
StartMenu.QuickLink.Spotlight.2.NoFocus.png RCDATA
"Png\\StartMenu.QuickLink.Discover.NoFocus.png"
StartMenu.QuickLink.Spotlight.2.Focus.png RCDATA
"Png\\StartMenu.QuickLink.Discover.Focus.png"
```

An image section, immediately below, defines other bitmap images used by the markup resources in the application package.

```
9.gif    RCDATA "Png\\9.gif"
26.gif   RCDATA "Png\\26.gif"
42.gif   RCDATA "Png\\42.gif"
```

Based on the markup data in the current page or menu and the user's current selection from that page or menu, one of three features can be selected: A, B, and C (in this example). If feature A is selected, an extraction operation 604 extracts from the package the markup data for an application page (identified by a target page identifier or TargetPageID) and the resources cited by that markup data, if any. Also, if specified in the markup data, a calling operation 606 calls to a local dynamic link library of a locally resident library of code components to provide desired functionality and/or resources (e.g., based on an identifier, pathname or address).

If feature B is selected, an extraction operation 608 extracts from the package the markup data for an application page (identified by a target page identifier or TargetPageID) and the resources cited by that markup data, if any. Also, if specified in the markup data, a calling operation 610 calls to a local dynamic link library of a locally resident library of code components to provide desired functionality and/or resources (e.g., based on an identifier, pathname or address). Furthermore, if specified in the markup data, another calling operation 612 calls to an external location (e.g., on the Web) to provide desired functionality and/or resources (e.g., based on an identifier, pathname or address).

If feature C is selected, an extraction operation 614 extracts the URL encoded in the target page identifier, if any. Also, if specified in the markup data, a calling operation 616 calls to an external location (e.g., on the Web) to provide desired functionality and/or resources (e.g., based on an identifier, pathname or address).

When the user interface framework has gathered the specified functionality and/or resources, a rendering operation 618 renders the application page in the user interface shell of the media application.

The example hardware and operating environment of FIG. 7 for implementing the invention includes a computing device, such as general purpose computing device in the form of a gaming console or computer 20, a mobile telephone, a personal data assistant (PDA), a set top box, or other type of computing device. In the implementation of FIG. 7, for example, the computer 20 includes a processing unit 21, a system memory 22, and a system bus 23 that operatively couples various system components including the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, a switched fabric, point-to-point connections, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, random access memories (RAMs), read only memories (ROMs), and the like, may be used in the example operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 6. The logical connections depicted in FIG. 6 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a network adapter, a type of communications device, or any other type of communications device for establishing communications over the wide area network 52. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are example and other means of and communications devices for establishing a communications link between the computers may be used.

In an example implementation, a user interface framework module, a download module, a discovery interface module, a library of code components, and other modules may be embodied by instructions stored in memory 22 and/or storage devices 29 or 31 and processed by the processing unit 21. A personal media library, content, databases, markup data, packages, resources, and other data may be stored in memory 22 and/or storage devices 29 or 31 as persistent datastores.

The technology described herein is implemented as logical operations and/or modules in one or more systems. The logical operations may be implemented as a sequence of processor-implemented steps executing in one or more computer systems and as interconnected machine or circuit modules within one or more computer systems. Likewise, the descriptions of various component modules may be provided in terms of operations executed or effected by the modules. The resulting implementation is a matter of choice, dependent on the performance requirements of the underlying system implementing the described technology. Accordingly, the logical operations making up the embodiments of the technology described herein are referred to variously as operations, steps, objects, or modules. Furthermore, it should be understood that logical operations may be performed in any order, unless explicitly claimed otherwise or a specific order is inherently necessitated by the claim language.

The above specification, examples and data provide a complete description of the structure and use of example embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention. In particular, it should be understood that the described technology may be employed independent of a personal computer. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the invention as defined in the following claims.

Although the subject matter has been described in language specific to structural features and/or methodological arts, it is to be understood that the subject matter defined in the appended claims is not necessarily limited to the specific features or acts descried above. Rather, the specific features and acts described above are disclosed as example forms of implementing the claimed subject matter.

What is claimed is:

1. A method of presenting a customized application page in an application, the method comprising:
    receiving an application package from a communications network, the application package containing markup data and one or more resources defining the customized application page;
    rendering an offering tile on a display by the application, the offering tile displaying a first graphic image defined by an image resource in the received application package when the offering tile is in focus, and a second graphic image defined by a second image resource in the received application package when the offering tile is not in focus;
    receiving a target page identifier in response to a user selection of the offering tile; and
    responsive to the receiving of the user selection of the offering tile,
        identifying markup data of the application package for the customized application page according to the received target page identifier,
        processing the identified markup data for the customized application page to identify at least one of the one or more resources of the application package referenced in the markup data, and
        rendering the customized application page defined by the identified markup data on the display to include the at least one resource.

2. The method of claim 1 wherein the received application package replaces a previously received application package referenced by the same target page identifier.

3. The method of claim 1 wherein the offering tile provides access to the customized application page defined by the markup data of the application package.

4. The method of claim 1 further comprising:
   setting in the customized application page a reference back parameter identifying a calling application page rendered prior to the customized application page.

5. The method of claim 1 further comprising:
   setting in the customized application page a reference back parameter identifying a user interface element of a calling application page rendered prior to the customized application page, the user interface element previously being used by a user to invoke the customized application page.

6. The method of claim 1 wherein the receiving operation comprises:
   periodically receiving additional application packages from a media information system server to replace the received application package, each received application package sharing a common target page identifier used by the application to reference customized application pages.

7. The method of claim 1 wherein the markup data of the received application package references at least one user interface class of the application.

8. A computer-readable storage device, comprising at least one of a storage drive and a memory, having computer-executable instructions for performing a computer process that presents a customized application page in an application, the computer process comprising:
   receiving an application package from a communications network, the application package containing markup data and one or more resources defining the customized application page;
   rendering an offering tile on a display by the application, the offering tile displaying a graphic image defined by an image resource in the received application package when the offering tile is in focus, and a second graphic image defined by a second image resource in the received application package when the offering tile is not in focus;
   receiving a target page identifier in response to a user selection of the offering tile; and
   responsive to the receiving of the user selection of the offering tile,
      identifying markup data of the application package for the customized application page according to the received target page identifier,
      rendering the customized application page defined by the identified markup data on the display to include at least one resource included in the application package.

9. The computer-readable storage device of claim 8 wherein the received application package replaces a previously received application package referenced by the same target page identifier.

10. The computer-readable storage device of claim 8 wherein the offering tile provides access to the customized application page defined by the markup data of the application package.

11. The computer-readable storage device of claim 8 wherein the computer process further comprises:
   setting in the customized application page a reference back parameter identifying a calling application page rendered prior to the customized application page.

12. The computer-readable storage device of claim 8 wherein the computer process further comprises:
   setting in the customized application page a reference back parameter identifying a user interface element of a calling application page rendered prior to the customized application page, the user interface element previously being used by a user to invoke the customized application page.

13. The computer-readable storage device of claim 8 wherein the receiving operation comprises:
   periodically receiving additional application packages from a media information system server to replace the received application package, each received application package sharing a common target page identifier used by the application to reference customized application pages.

14. The computer-readable device of claim 8 wherein the markup data of the received application package references at least one user interface class of the application.

15. A system that presents a customized application page in an application, the system comprising:
   an network adapter that receives an application package from a communications network, the application package containing markup data and one or more resources defining the customized application page; and
   a processor that executes a shell module communicatively coupled to the network adapter, the shell rendering an offering tile on a display by the application, the offering tile displaying a graphic image defined by an image resource in the received application package when the offering tile is in focus, and a second graphic image defined by a second image resource in the received application package when the offering tile is not in focus, receiving a target page identifier in response to a user selection of the offering tile, identifying markup data of the application package for the customized application page according to the received target page identifier, the processor further executing a user interface framework coupled to the shell module that renders the customized application page defined by the identified markup data on the display to include at least one resource included in the application package.

16. The system of claim 15 wherein the network adapter further periodically receives additional application packages from a media information system server to replace the received application package, each received application package sharing a common target page identifier used by the application to reference customized application pages.

* * * * *